May 5, 1953  H. W. STEIN ET AL  2,637,098
METHOD OF FORMING COMMUTATORS
Filed May 18, 1949  2 SHEETS—SHEET 1

INVENTOR.
Herman W. Stein &
John D. Risher
BY
Harry S. Dumass
ATTORNEY.

May 5, 1953  H. W. STEIN ET AL  2,637,098
METHOD OF FORMING COMMUTATORS
Filed May 18, 1949  2 SHEETS—SHEET 2
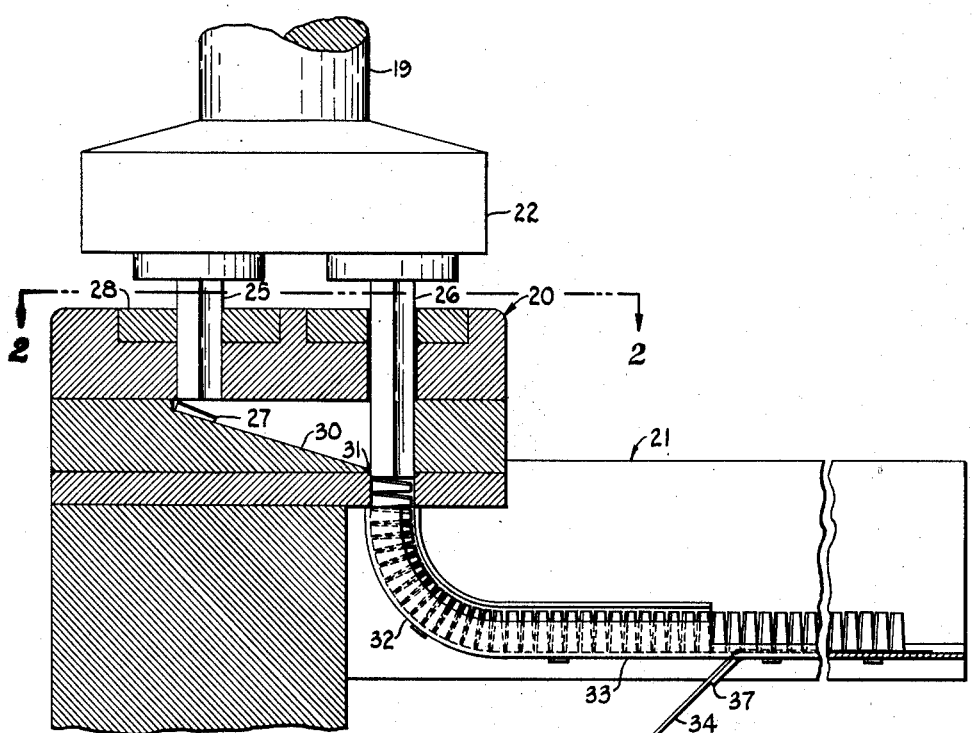
Fig.3
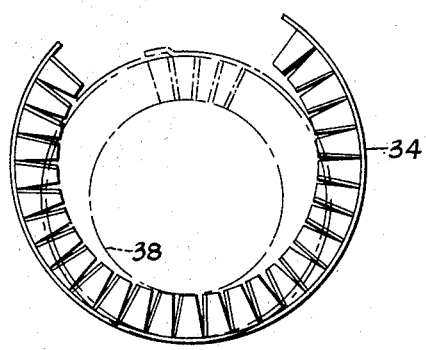
Fig.4
INVENTOR.
Herman W. Stein &
John D. Risher
BY
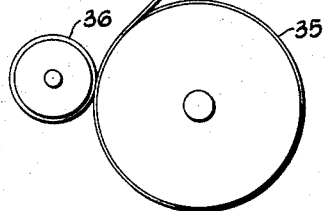
ATTORNEY.

Patented May 5, 1953

2,637,098

UNITED STATES PATENT OFFICE 2,637,098

METHOD OF FORMING COMMUTATORS

Herman W. Stein, Canton, and John D. Risher, North Canton, Ohio, assignors to The Hoover Company, North Canton, Ohio, a corporation of Ohio Application May 18, 1949, Serial No. 93,886

1 Claim. (Cl. 29—155.54)

This invention relates to commutators for motors and more particularly to the method of making them and the stock from which the commutator is made.

Prior to this invention it was common practice to stamp commutator segments from a tapered strip of stock, to separately stamp the insulating segments from a strip of insulating stock, and to then separately assemble the copper segments and the insulating separators alternately into a ring formation prior to the assembly of the end clamping rings. This requires the use of skilled operators, requires considerable time, and is quite expensive.

According to the broader aspects of the present invention a strip of the insulating separator is cemented to a strip of tapered copper stock to form a laminated strip of stock comprising a narrow wedge shaped strip of soft copper with a strip of insulating material of uniform thickness cemented thereto.

The laminated strip thus formed is automatically fed into a die or stamping machine where the wedge shaped copper segments with separating insulators adhered to one face thereof are stamped from the laminated strip. The laminated segment thus formed is automatically fed into a chute with the insulating side of the segments all facing in the same direction preferably upwardly. From the chute the laminated segments are fed to an assembling station where the laminated segments are formed into a ring to form a commutator ring of the desired size prior to the assembly of the end clamping rings thereto.

According to the present invention it is unnecessary to separately stamp the wedge shaped segments and the separating insulator segments, nor is it necessary to separately assemble the wedge shaped segments in the form of a commutator ring with an insulator segment between each commutator segment.

According to the present invention the laminated segments are automatically assembled in the proper relationship. There is no need to select a proper number of each segment nor to give thought to their proper arrangement. There is no danger that two copper segments will be assembled side by side without a separating insulator segment nor is there danger that two insulator segments will be assembled between two adjacent copper segments.

Other objects and advantages of the invention will become apparent as the description proceeds when taken in connection with the accompanying drawings, in which:

Figure 3 is a vertical cross-sectional view showing further details of the stamping and assembling stations taken on line 3—3 of Fig. 2 and looking in the direction of the arrows; and Figure 4 shows how the assembled segments are formed into a ring to form a completed commutator ring prior to the assembly of the end clamping rings.

Figure 1:
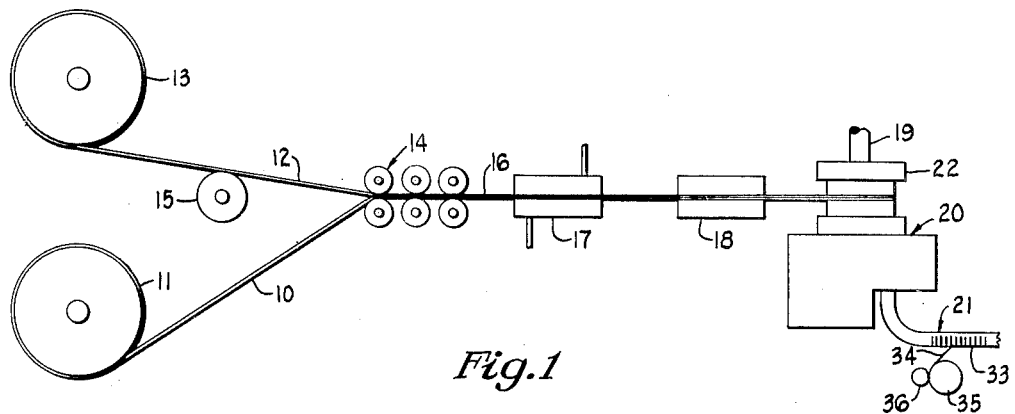
Figure 1 is a schematic view of the general arrangement for carrying out the process of this invention.

Referring to Fig. 1 of the drawings a narrow wedge shaped copper strip 10, in the form of a roll 11, and an insulator strip 12 preferably paper of a suitable character and of uniform thickness, in the form of a roll 13, are simultaneously unwound and brought into face to face juxtaposition to each other at the pressure rolls 14.

In passing from the roll 13 to the pressure rolls 14 the insulator strip 12 is passed over a cement applying roll 15 where a suitable cement or glue is applied to the lower side of the insulator strip 12. The cement applied is of such character that the insulator strip 12 and the copper strip 10 will adhere together under the pressure applied at the pressure rolls 14.

From the pressure rolls 14 the laminated strip 16 thus formed comprising the narrow wedge shaped copper strip 10 and the insulator strip 12 of uniform thickness is fed to a drier 17 where heat of the proper temperature is applied to set the cement applied at the roll 15 so that the strips 10 and 12 are permanently adhered to each other.

The stock including the individual strips 10 and 12 are fed through the apparatus at a proper intermittent speed by a stock feeding device 18 of any suitable character which acts upon the laminated stock 16 to advance it in a step-by-step manner. The operation of the stock feeding device 18 is properly synchronized with that of the stamping plunger 19 whereby the stock is advanced the proper distance for the stamping punches (to be described in detail hereinafter) to sever the proper length of stock at each reciprocation of the plunger 19.

The laminated segments severed at the stamping station 20 are fed to an assembling station generally indicated by the reference numeral 21.

Figure 2:
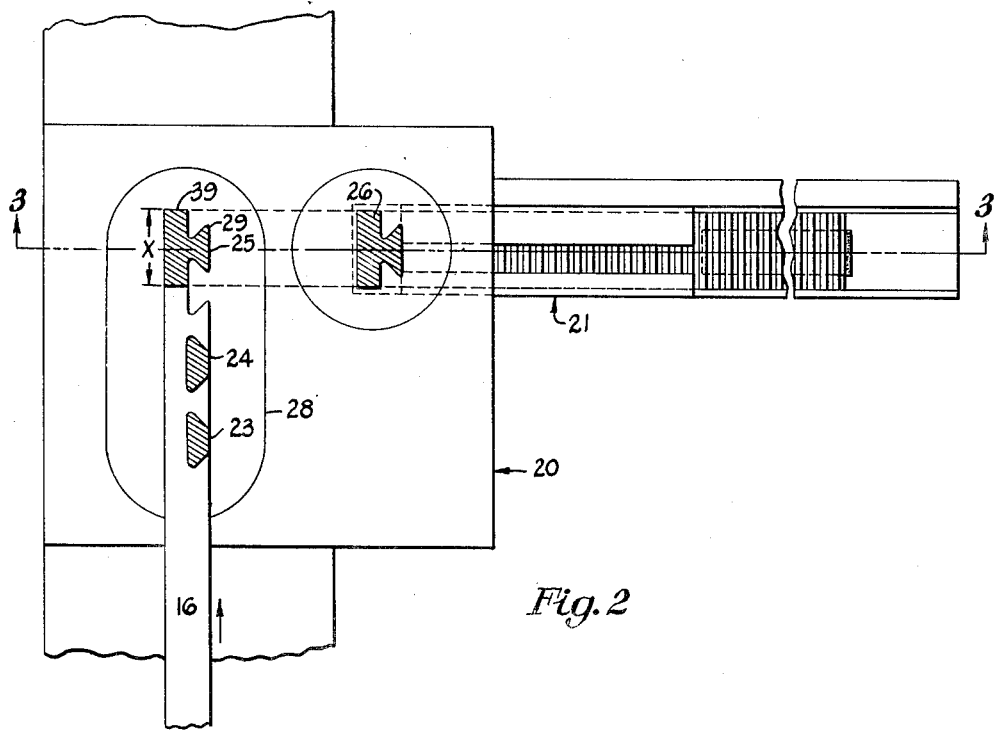
Figure 2 is a plan view partly in section showing certain details of the stamping and assembling stations of Fig. 1 taken on line 2—2 of Fig. 3 looking in the direction of the arrows.

Referring to Figs. 2 and 3 the plunger 19 carries a head 22 which in turn carries a notching punch 23, of dovetail shape in cross-section which cuts an identically shaped piece out of the laminated stock 16 at the thin edge thereof, a locating punch 24 of the same shape and size as the punch 23, a cut-off punch 25 of the same shape and size in cross-section as the area of the completed laminated segment 27 and a feed plunger 26 also of the same shape and size in cross-section as the area of the completed laminated segments.

The notching punch 23 and the cut-off punch 25 cooperate with a die plate 28 having cutting openings therein in alignment with the punches 23 and 25 and complementary thereto whereby upon reciprocation of the plunger 19 the openings in the die plate 28 will cooperate with the punches to shear through the lamination 16 as it is fed between the die plate and the punches.

As shown, the cross-sectional shape of the punches 25 and 26 and of the completed laminated segments 27 is that of a rectangular portion 39 with a dovetail portion 29 appended to one of the long sides of the rectangular portion midway of the ends thereof.

The operation of the stock feeding device 18 is synchronized with the reciprocation of the plunger 19 so that at each reciprocation of the plunger 19 the laminated stock 16 is advanced a distance X (Fig. 2) which is the length of the completed commutator.

The cut-off punch 25 in cooperation with the complemental opening in the die plate 28 severs the laminated segments 27 and simultaneously projects them onto the sloping ramp 30 which is slightly wider than the width X whereby the segments 27 will slide downwardly of the ramp 30 to a downwardly extending opening 31 in the die block.

Extending downwardly and forwardly from the opening 31 is a chute 32 of a size and shape to freely pass the laminated segments 27 but which will prevent them from canting out of normal position. As the laminated segments 27 reach the opening 31, the feed plunger 26 moves them downwardly into the chute 32 a distance equal to the thickness of the segments at their thick edge.

From the chute 32 the segments 27 are projected onto a horizontally extending ramp 33 as shown. As the segments 27 are projected onto the ramp 33 their thick edges slide onto a paper strip 34 having its upper side coated with a tacky adhesive. The paper strip is fed to the ramp 33 from a roll 35 which is rotated clockwise in a step-by-step manner in synchronism with the action of the plunger 19 so that the strip is advanced a distance equal to the thick edge of the laminations 27 at each reciprocation of the plunger 19. The tacky adhesive is applied to the strip 34 from an adhesive applying roll 36 and the strip 34 is led to the ramp 33 by a guide 37.

It is to be noted that the laminated blank 16 is fed to the stamping station 20 with the insulation on its upper side. It has been found that by such an arrangement there will be less burring of the segments during the stamping operations.

Operation

As previously explained the stock feeding device 18, the plunger 19 and the roll 35 are operated in synchronism. Operation of the stock feeding device 18 acts to advance the laminated stock 16 the distance X in a step-by-step fashion upon each reciprocation of the plunger 19. That will cause the wedge shaped copper strip 10 and the insulating strip 12 to be unwound from the rolls 11 and 13 respectively. As the insulating strip 12 passes over the roll 15 cement will be applied to its underside. The two strips 10 and 12 then advance to the pressure roll 14 where the pressure applied in forcing the two strips 10 and 12 together with the cement therebetween will cause them to be adhered to each other in face to face relationship. The laminated stock 16 thus formed will then be advanced through the drier 17 where heat is applied to set the cement and permanently adhere the strips together.

The laminated stock 16 is then fed to the stamping station 20 a distance X for each reciprocation of the plunger 19. The notching punch 23 first stamps out a dovetail piece from the thin side of the lamination 16. On the succeeding reciprocations of the plunger 19 the notch formed by the notching punch is advanced to a position beneath the locating punch 24 which enters the notch and locates the lamination 16 relative to the die openings beneath the punches 23 and 25 to assure that each notch will be properly located and that all segments will be severed midway of the length of the notches.

At the next reciprocation of the plunger 19 the laminated stock 16 will have advanced another distance X so that as the punch 25 descends its trailing severing edge will sever the stock midway of the dovetail notches formed by the notching punch 23 so as to form laminated segments 27 having a rectangular part 39 and a dovetail shaped projection extending from one of the thin edges of the rectangle midway of the length thereof.

The punch 25 will deposit the segments 27 thus formed to the upper end of the inclined ramp 30 whereby the segments 27 will slide downwardly and enter the opening 31 at the base of the incline. Due to the close tolerances involved between the segments 27, the ramp 30, and the opening 31 the segments 27 will remain in a position in which the insulating segment is positioned upwardly and will fall downwardly into the chute 32 in that position.

As each laminated segment 27 enters the opening 31 the feed plunger 26, at the next reciprocation of the plunger 19, will press it downwardly a distance equal to the thickness of the laminated segments 27 at their thick edge. That will cause the segments 27 to move downwardly through the chute 32 onto the ramp 33 on top of the tacky surface of the strip 34 and with their thick edges resting on the tacky surface of the strip. The thick edges of the segment 27 will adhere to the tacky surface of the strip 34 as the strip and segments are advanced.

Eventually a sufficient number of laminated segments 27 will be adhered to the strip 34 to form a complete commutator ring of the desired size. The strip 34 is then severed and the short length of the strip 34 thus formed with the adhering segments are formed into a commutator ring 38 as shown in Fig. 4.

The commutator ring 38 thus formed may then be assembled with end clamping rings in any suitable manner, for example, by the method shown by the patent to Batchelder 539,022. The movement of the commutator ring 38 into the compressing ring D of Batchelder will automatically remove the strip 34 from the back of the segments 27.

From the foregoing it can be seen that this invention provides a strip of stock for use in the formation of commutators in the form of a laminated strip comprising a thin strip of copper, wedge shaped in cross-section with a strip of insulating material of uniform thickness permanently adhered to one face thereof.

It can also be seen that this invention comprises a method of making a commutator comprising bringing a thin strip of copper, wedge shaped in cross-section, into face to face juxtaposition with a thinner strip of insulating material of uniform thickness, permanently adhering the strips to each other to form a laminated strip, wedge shaped in cross-section, stamping dovetail notches in the thin edge of the laminated strip, severing the strip midway of the length of the notches to form laminated segments, simultaneously assembling the segments in rows with their thick edges downwardly and with the insulation segments all facing in the same direction, and forming the rows into commutator rings.

It is to be understood that this invention is not limited to the particular method of assembling the laminated segments into a commutator ring but that other assembly methods may also be used. For example, the chute could be a spiral twisted formation leading to a ring shaped assembling fixture so that the segments, as they enter the fixture, would be positioned on one end with their thick edges facing the internal periphery of the fixture and with the insulated sides of the segments all facing in the same direction. The ring D of the patent to Batchelder could be positioned below the fixture and when the fixture is filled the assembled ring of segments could be pressed downwardly into the ring D of Batchelder. The laminated segments could also be assembled by hand with a considerable saving over the conventional method of assembling commutators.

While we have shown but a single embodiment of our invention it is to be understood that this embodiment is to be taken as illustrative only and not in a limiting sense. We do not wish to be limited to the specific structure and method shown and described but to include all equivalent variations thereof except as limited by the scope of the claim.

We claim:

The method of forming a commutator comprising, bringing a thin narrow wedge shaped strip of copper into face to face juxtaposition with a thinner strip of insulating material of uniform thickness and of the same width as the copper strip, permanently adhering said strips together to form a thin narrow laminated wedge shaped strip, punching dovetail notches in the thin edge of said laminated strip and severing said strip midway of the length of said notches to form laminated segments in the form of wedge shaped segments of copper having a dovetail projection on its thin edge midway of the length thereof and a thin segment of insulating material of the same shape and size permanently adhered to one face thereof and assembling said segments into a ring with the thick edges outwardly and the insulating segments all facing in the same direction as said segments are severed from said laminated strip.

HERMAN W. STEIN.
JOHN D. RISHER.

References Cited in the file of this patent

UNITED STATES PATENTS

| Number | Name | Date |
| --- | --- | --- |
| 523,663 | Hoffman | July 31, 1894 |
| 624,167 | Brooker | May 2, 1899 |
| 1,018,138 | Stanley | Feb. 20, 1912 |
| 1,282,051 | Doman | Oct. 22, 1918 |
| 1,429,352 | Janke | Sept. 19, 1922 |
| 1,508,365 | Lukens | Sept. 9, 1924 |
| 1,619,227 | Widell | Mar. 1, 1927 |
| 1,759,500 | Frederick | May 20, 1930 |
| 1,788,260 | Warth | Jan. 6, 1931 |
| 1,835,120 | Poole | Dec. 8, 1931 |
| 2,085,092 | Furth | June 29, 1937 |
| 2,251,326 | Cullin | Aug. 5, 1941 |
| 2,394,955 | Weber | Feb. 12, 1946 |
| 2,486,875 | Pollock | Nov. 1, 1949 |

FOREIGN PATENTS

| Number | Country | Date |
| --- | --- | --- |
| 16,027 | Great Britain | 1914 |
| 887,993 | France | Nov. 29, 1943 |